United States Patent
Tanaka et al.

(10) Patent No.: US 8,402,651 B2
(45) Date of Patent: Mar. 26, 2013

(54) METHOD OF MANUFACTURING VANE

(75) Inventors: Tomonari Tanaka, Chigasaki (JP); Mitsuru Yahagi, Chigasaki (JP); Kouji Shibayama, Chigasaki (JP); Takashi Nakamura, Chigasaki (JP); Yuuji Fukaura, Ningbo (CN)

(73) Assignee: Ulvac, Inc., Chigasaki-Shi (JP)

( * ) Notice: Subject to any disclaimer, the term of this patent is extended or adjusted under 35 U.S.C. 154(b) by 451 days.

(21) Appl. No.: 12/369,803

(22) Filed: Feb. 12, 2009

(65) Prior Publication Data

US 2009/0211092 A1  Aug. 27, 2009

(30) Foreign Application Priority Data

Feb. 21, 2008 (WO) ............... PCT/IB2008/000385

(51) Int. Cl.
*B21K 3/04* (2006.01)
*B05D 3/00* (2006.01)

(52) U.S. Cl. ............... 29/889.7; 29/888.025; 427/294; 427/314; 427/443

(58) Field of Classification Search ........... 29/889.7, 29/888.025; 427/294, 295, 314, 350, 443
See application file for complete search history.

(56) References Cited

U.S. PATENT DOCUMENTS

| | | | |
|---|---|---|---|
| 7,703,983 B2 * | 4/2010 | Tsutsui et al. | 384/279 |
| 7,910,198 B2 * | 3/2011 | Hirata et al. | 428/308.4 |
| 2008/0152853 A1 * | 6/2008 | Blanton et al. | 428/36.4 |

FOREIGN PATENT DOCUMENTS

| | | |
|---|---|---|
| DE | 2504821 | 8/1976 |
| GB | 1324443 | 7/1973 |
| JP | 01300079 | 12/1989 |
| JP | 04262116 | 9/1992 |
| JP | 06108984 | 4/1994 |
| JP | 01300079 | 12/1999 |
| JP | 2002070771 | 3/2002 |
| JP | 2003042085 | 2/2003 |
| JP | 2004292854 A * | 10/2004 |
| JP | 2005272652 | 10/2005 |
| JP | 2006-063278 | 3/2006 |
| JP | 04262116 | 9/2006 |
| JP | 2006328215 | 12/2006 |
| TW | 289072 | 10/1996 |
| TW | 430723 | 4/2001 |

OTHER PUBLICATIONS

German Office Action from corresponding German Application No. 102009008906.3-16 dated Apr. 7, 2010.
Notice of Allowance from corresponding Korean Application No. 10-2009-0013106 dated Nov. 23, 2011. English translation attached.
Office Action from corresponding Taiwanese Application No. 098104208 dated May 30, 2012. English translation attached.

* cited by examiner

*Primary Examiner* — Sarang Afzali
(74) *Attorney, Agent, or Firm* — Grossman, Tucker, Perreault & Pfleger, PLLC (57) ABSTRACT

A method is provided which manufactures a vane used for an oil-sealed rotary vacuum pump and having at least a part formed of a resin material, the method including: an oil impregnating process of immersing the vane into oil used for the oil-sealed rotary vacuum pump under a depressurized condition, the oil impregnating process being carried out before a finishing process of finishing the vane into a final shape.

4 Claims, 7 Drawing Sheets

METHOD OF MANUFACTURING VANE

Priority is claimed on International Application No. PCT/IB2008/000385, filed Feb. 21, 2008, the content of which are incorporated herein by reference.

BACKGROUND OF THE INVENTION

1. Field of the Invention

The present invention relates a method of manufacturing a vane.

2. Description of the Related Art

An oil-sealed rotary vacuum pump of a rotary blade type has been used in which an exhausting operation is carried out by a compressing operation using a plurality of vanes. The oil-sealed rotary vacuum pump includes a rotor rotating in the inside of a cylinder and a vane protruding from the rotor toward the cylinder. The vane of the oil-sealed rotary vacuum pump has a function of dividing a compressing space, and is formed of a resin material such as thermosetting resin (for example, see Japanese Unexamined Patent Application, First Publication No. 2006-328215 and Japanese Unexamined Patent Application. First Publication No. 2005-272652).

FIG. 5 is a flow diagram showing a method of manufacturing the vane according to the related art. The method of manufacturing the vane according to the related art includes a base material forming process (a) of forming a base material 131 (FIG. 5A); a crude processing process (b) of forming a crude product 132 from the base material 131 (FIG. 5B); a drying or heat-treating process (c) of drying or heat-treating the crude product 132 by a heater 146 (FIG. 5C); a finishing process (d) of finishing the crude product 132 to obtain a final product 130 (FIG. 5D); a storing process (e) of storing the final product 130 while preventing moisture absorption using a dryer 152 (FIG. 5E); and an oil impregnating process (f) of immersing the final product 130 into oil 190 used for the oil-sealed rotary vacuum pump (FIG. 5F).

The oil-sealed rotary vacuum pump generates heat by the compressing operation during the operation thereof. Accordingly, an uncured portion of the thermosetting resin forming the vane may be cured to thereby shrink the vane. When the vane shrinks to thereby increase a gap between the vane and the cylinder, an ultimate pressure increases, so that an exhausting speed decreases and a noise level increases.

Therefore, the heat-treating process (FIG. 5C) of the method of manufacturing the vane according to the related art is carried out at a temperature higher than a temperature of the vane upon running the oil-sealed rotary vacuum pump.

A pressure in the vicinity of the vane is approximately equal to a vacuum state upon running the oil-sealed rotary vacuum pump. However, in the method of manufacturing the vane according to the related art, the heat-treating process (FIG. 5C) is carried out at the atmospheric pressure. When the heat-treating process is carried out at the atmospheric pressure, since a curing speed of the thermosetting resin is slower than that in the heat-treating process in the vacuum state, it is not possible to completely cure the uncured portion of the thermosetting resin. For this reason, the curing of the resin material further progresses upon running the oil-sealed rotary vacuum pump, thereby causing a problem of shrinking deformation of the vane.

Furthermore, since the heat-treating process (FIG. 5C) is carried out at the atmospheric pressure, it is difficult to completely separate a low vapor pressure component contained in the material of the vane. For this reason, the low vapor pressure component is separated from the vane upon running the oil-sealed rotary vacuum pump, thereby causing a problem of shrinkage deformation of the vane.

Figure 5A:
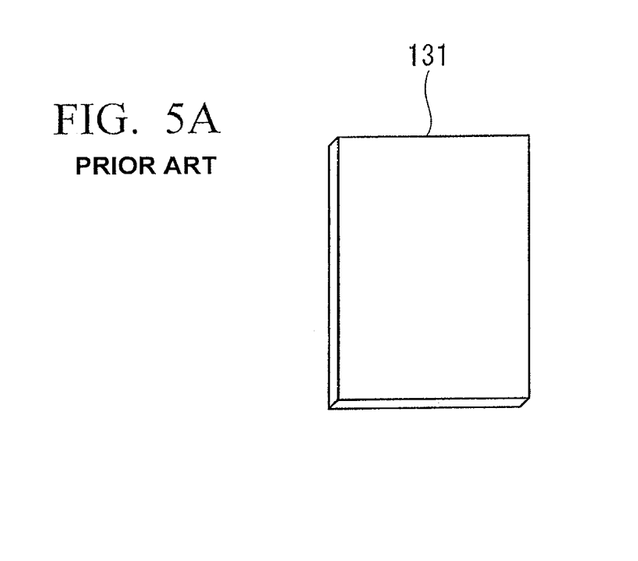
FIGS. 5A to 5F are flow diagrams showing a method of manufacturing the vane according to the related art.
Figure 5B:
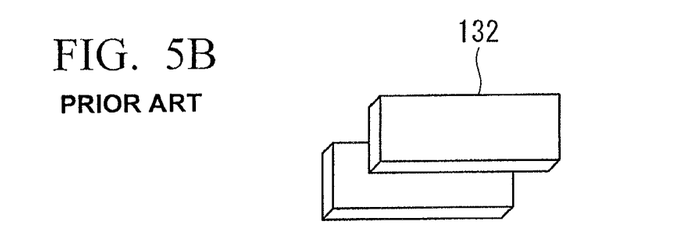
Figure 5C:
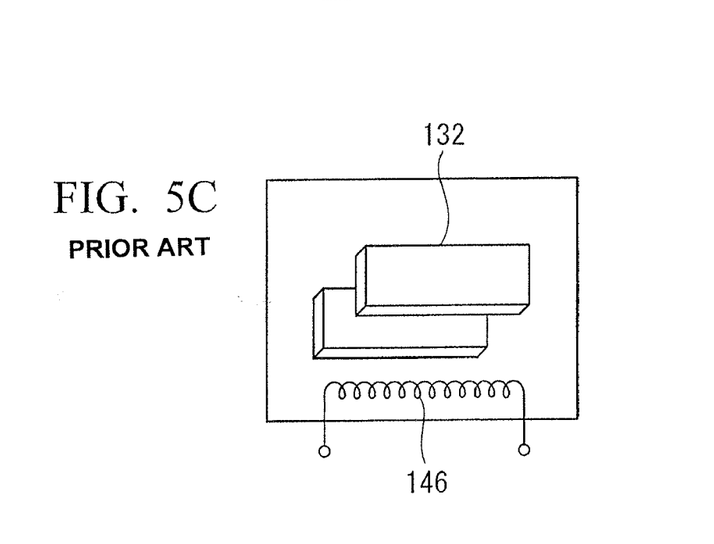
Figure 5D:
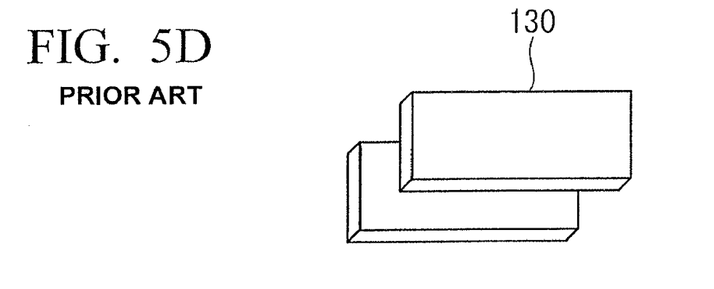
Figure 5E:
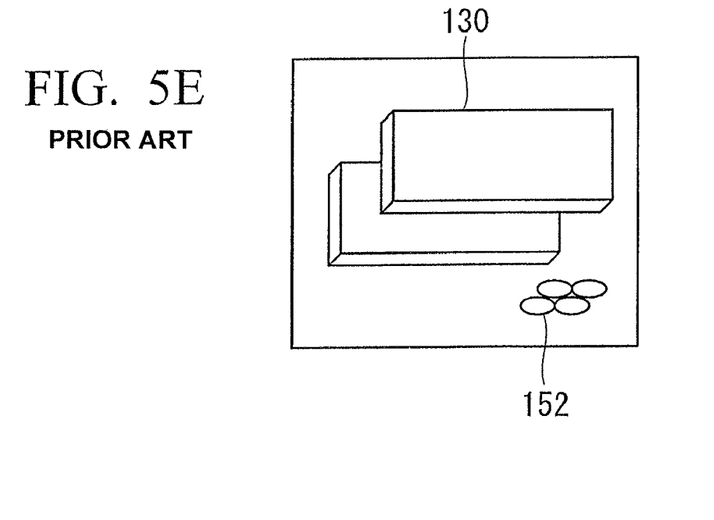
Figure 5F:
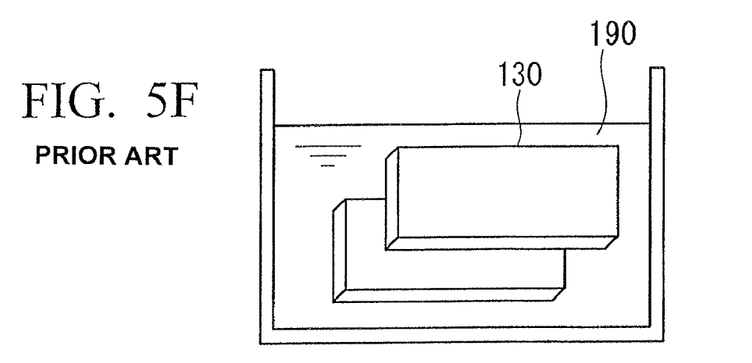

Furthermore, even when the low vapor pressure component is completely removed by carrying out the heat-treating process (FIG. 5C) at a high temperature, moisture contained in the atmosphere enters space formed by the removal (moisture absorption), thereby causing dilation deformation of the vane before the finishing process (FIG. 5D). For this reason, the moisture is separated from the vane upon running the oil-sealed rotary vacuum pump, thereby causing a problem of shrinkage deformation of the vane.

SUMMARY OF THE INVENTION

Therefore, an object of the invention is to provide a method of manufacturing a vane capable of preventing deformation thereof upon running an oil-sealed rotary vacuum pump.

In order to achieve the above-described object, according to an aspect of the invention, there is disclosed a method of manufacturing a vane used for an oil-sealed rotary vacuum pump and having at least a part formed of a resin material, the method including: an oil impregnating process of immersing the vane into oil used for the oil-sealed rotary vacuum pump under a depressurized condition, the oil impregnating process being carried out before a finishing process of finishing the vane into a final shape.

With such a configuration, it is possible to remove a low vapor pressure component from the inside of the vane by disposing the vane under the depressurized condition. Furthermore, since the vane is immersed into the oil, it is possible to impregnate the oil into an inner space of the vane. For this reason, it is possible to prevent dilation deformation caused by the vane absorbing moisture before the finishing process. Accordingly, it is possible to prevent the deformation of the vane caused by the moisture removed from the vane upon running the oil-sealed rotary vacuum pump.

In the method having the above-described configuration, in the oil impregnating process, the vane may be heated to a predetermined temperature via the oil.

With such a configuration, since the vane is heated under the depressurized condition, it is possible to efficiently remove the low vapor pressure component from the inside of the vane. Then, since it is possible to impregnate the oil into a space formed by the removal, it is possible to prevent the deformation of the vane upon running the oil-sealed rotary vacuum pump.

Meanwhile, according to another aspect of the invention, there is disclosed a method of manufacturing a vane used for an oil-sealed rotary vacuum pump and having at least a part formed of a resin material, the method including: a heating process of heating the vane at a predetermined temperature under a depressurized condition, the heating process being carried out before a finishing process of finishing the vane to have a final shape; and an oil impregnating process of immersing the vane into oil used for the oil-sealed rotary vacuum pump in a state where the vane is maintained under the depressurized condition from the heating process.

With such a configuration, it is possible to efficiently remove the low vapor pressure component from the inside of the vane in the heating process. Additionally, since the vane is maintained under the depressurized condition from the heating process to the oil impregnating process, it is possible to impregnate the oil into the space formed by the removal of the low vapor pressure component in a state where moisture absorption of the vane is prevented. Accordingly, it is possible to prevent the deformation of the vane upon running the oil-sealed rotary vacuum pump.

In the method having the above-described configuration, the predetermined temperature may be a temperature equal to or higher than a maximum temperature of the vane upon running the oil-sealed rotary vacuum pump.

With such a configuration, since the vane is heated to a temperature equal to or higher than the maximum temperature thereof so that the low vapor pressure component is removed in advance from the inside of the vane, it is possible to prevent the separation of the low vapor pressure component from the inside of the vane upon running the oil-sealed rotary vacuum pump and to prevent the deformation of the vane upon running the oil-sealed rotary vacuum pump.

In the method having the above-described configuration, a pressure of the depressurized condition may be equal to or lower than a minimum pressure in the vicinity of the vane upon running the oil-sealed rotary vacuum pump.

With such a configuration, since the vane is maintained at a pressure equal to or lower than the minimum pressure so that the low vapor pressure component is removed in advance from the inside of the vane, it is possible to prevent the separation of the low vapor pressure component from the inside of the vane upon running the oil-sealed rotary vacuum pump and to prevent the deformation of the vane upon running the oil-sealed rotary vacuum pump.

In the method having the above-described configuration, the resin material may be thermosetting resin.

With such a configuration, it is possible for the curing of the resin material to progress by heating the vane under the depressurized condition. Accordingly, it is possible to prevent the deformation of the vane caused by the progression of the curing of the resin material upon running the oil-sealed rotary vacuum pump.

DETAILED DESCRIPTION OF THE INVENTION

Hereinafter, an oil-sealed rotary vacuum pump according to embodiments of the invention will be described with reference to the accompanying drawings.

(Oil-Sealed Rotary Vacuum Pump)

Figure 1:
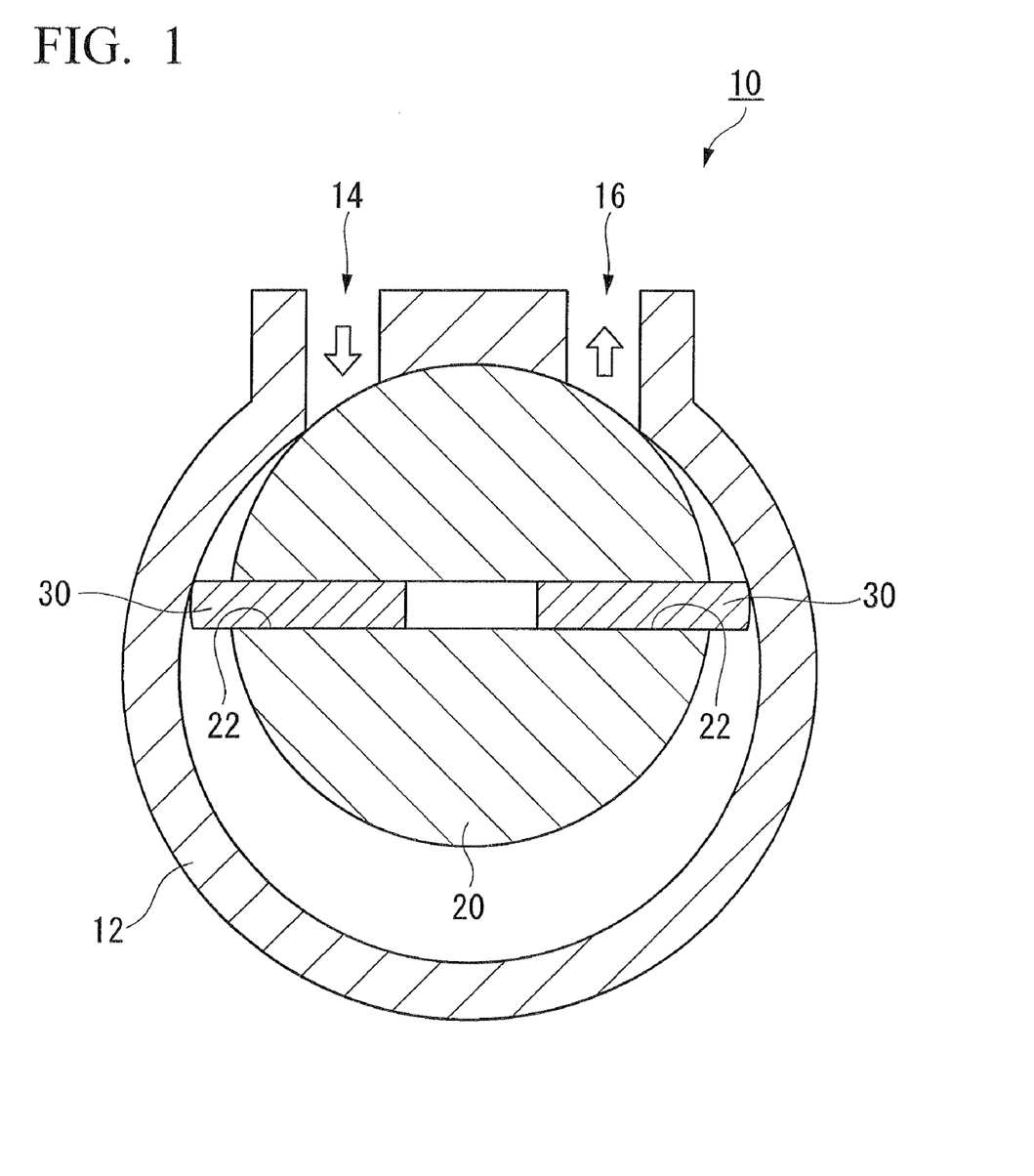
FIG. 1 is a front cross-sectional diagram showing a schematic configuration of an oil-sealed rotary vacuum pump.

FIG. 1 is a front cross-sectional diagram showing a schematic configuration of an oil-sealed rotary vacuum pump. An oil-sealed rotary vacuum pump 10 includes a tubal cylinder 12. A suction port 14 and an exhaust port 16 are provided at the upper portion of the cylinder 12. A cylindrical rotor 20 is disposed on the inside of the cylinder 12. The rotary axis of the rotor 20 is disposed while being offset to a position above the central axis line of the cylinder 12.

Figure 2:
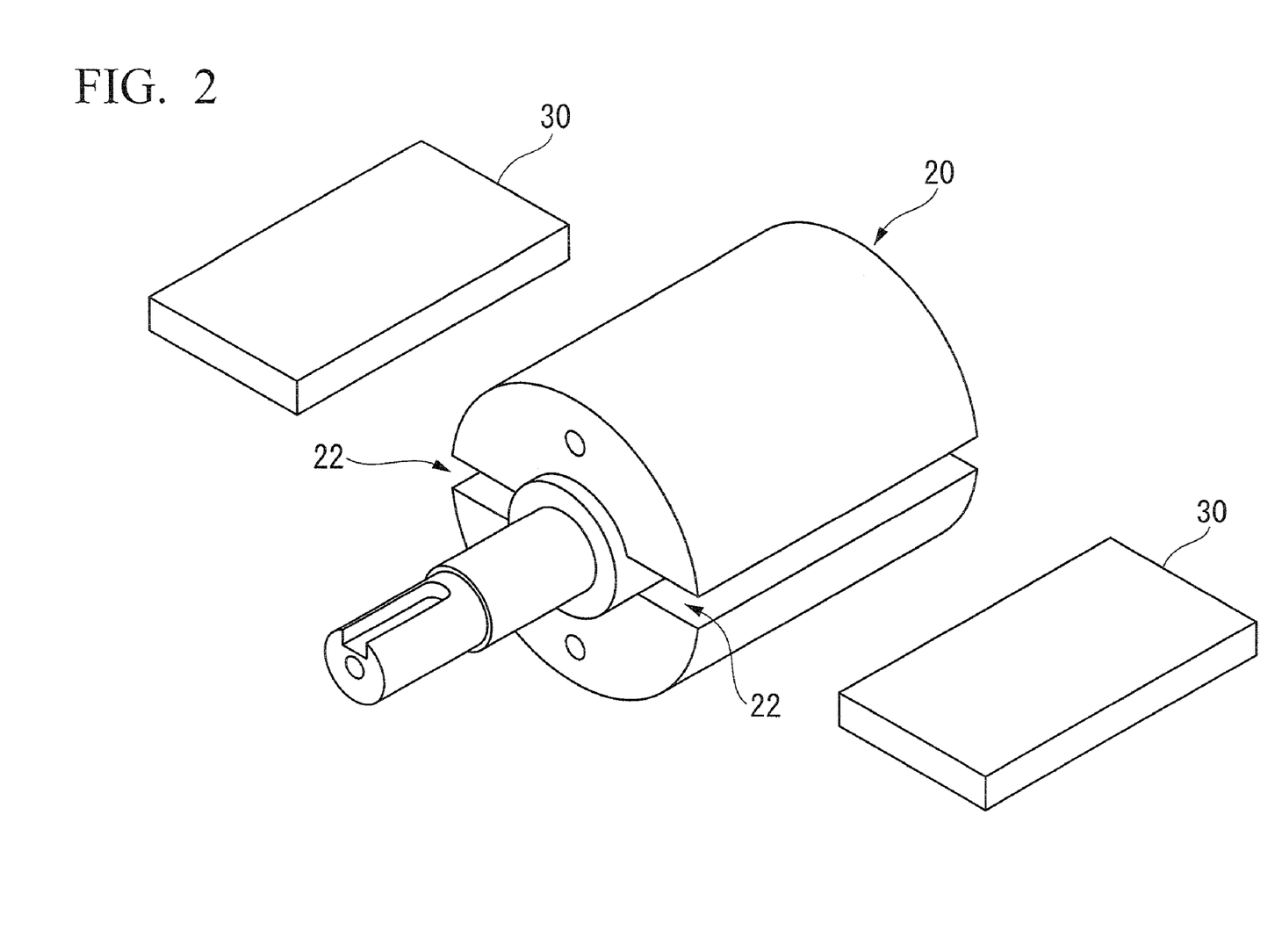
FIG. 2 is an exploded perspective diagram showing a rotor.

FIG. 2 is an exploded perspective diagram showing the rotor. A plurality of slots 22 (in this embodiment, the number of slots is two) is formed from the outer peripheral surface of the rotor 20 toward the rotary shaft so as to be in parallel to the rotary shaft. A vane 30 is inserted into each slot 22.

The vane 30 is formed in a flat plate shape by applying a resin material coating on a sheet in which fiber such as chemical fiber or glass fiber is woven in a mesh shape. Thermosetting resin such as phenolic resin is used as the resin material. Alternatively, the vane 30 may be formed of only the resin material. Thermoplastic resin may be used as the resin material depending on the temperature condition of the pump operation.

As shown in FIG. 1, when the rotor 20 rotates, the vane 30 is displaced in a direction protruding from the slot due to a centrifugal force. Accordingly, the rotor 20 rotates in a state where the front end portion of the vane 30 is brought into contact with the inner surface of the cylinder 12. Since the rotary axis of the rotor 20 is disposed offset from the central axis of the cylinder 12, a volume of a space surrounded by the rotor 20, the cylinder 12, and the vane 30 changes in accordance with the rotation of the rotor 20. By this volume change, gas transportation is carried out.

In general, the oil-sealed rotary vacuum pump 10 has a structure in which an entry of external air is prevented by immersing a portion of the cylinder or the plate into oil stored in an oil tank (not shown). Then, the structure is configured such that a necessary amount of oil is aspirated for sealing using oil coating and lubrication.

(Method of Manufacturing Vane)
(First Embodiment)

Next, a method of manufacturing the vane according to a first embodiment of the invention will be described.

Figure 3A:
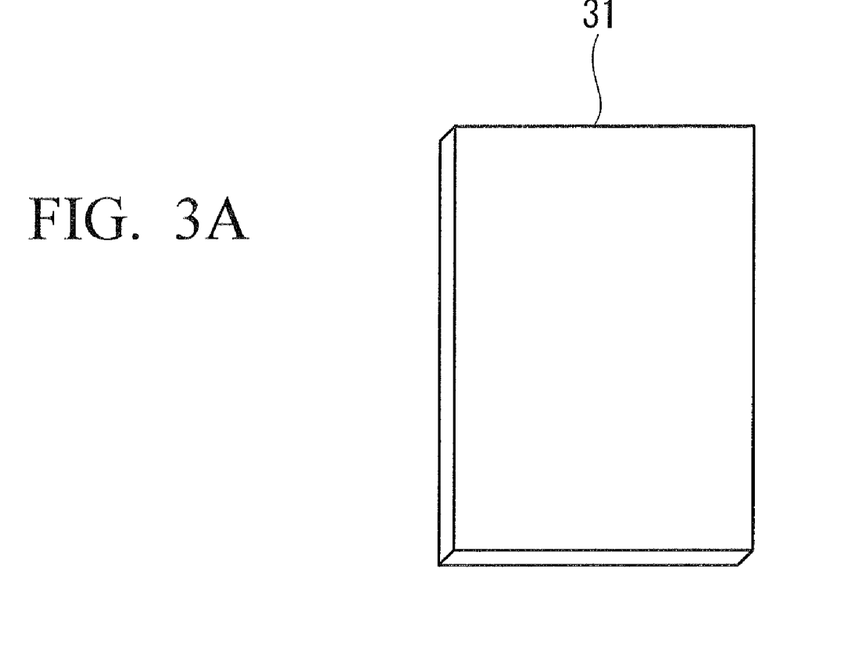
FIGS. 3A to 3D are flow diagrams showing a method of manufacturing a vane according to an embodiment of the invention.
Figure 3B:
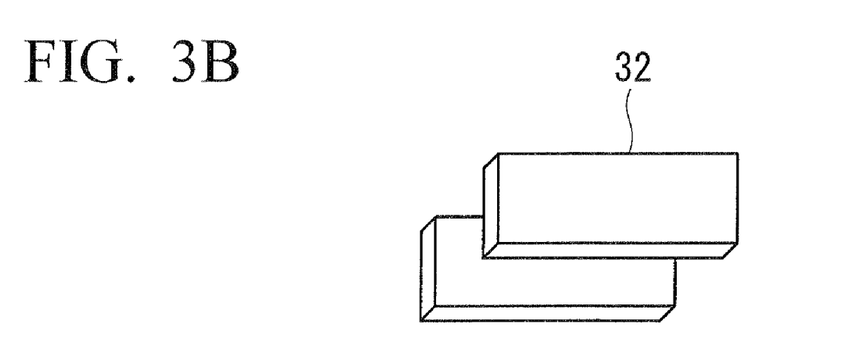
Figure 3C:
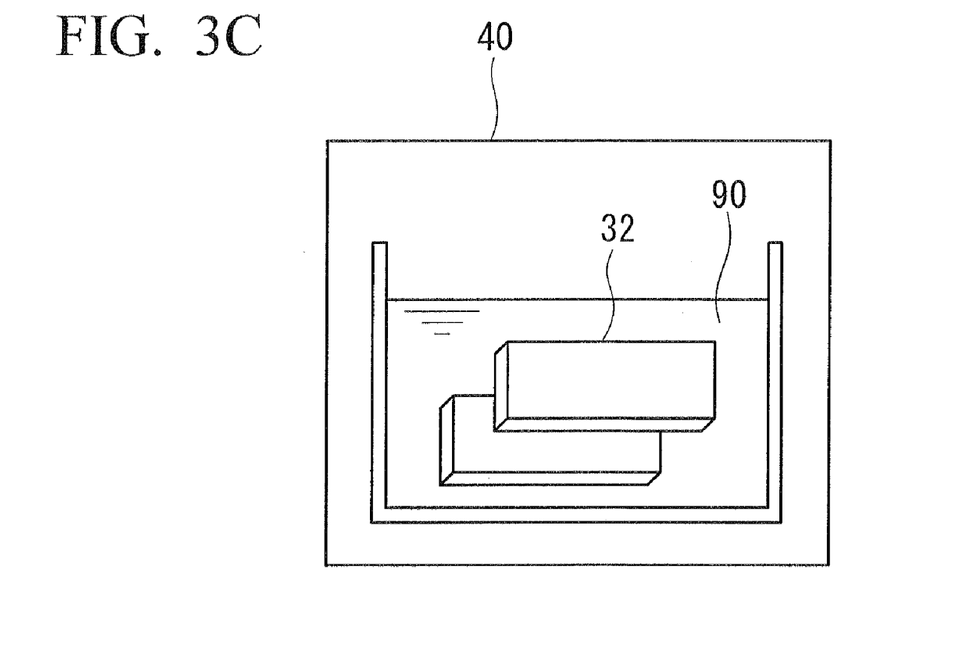
Figure 3D:
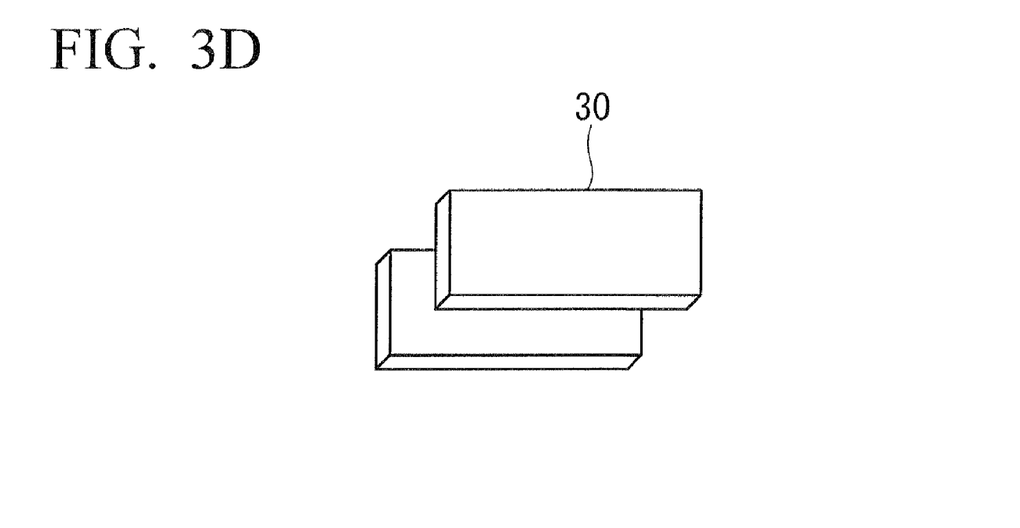

FIGS. 3A to 3D are flow diagrams showing a method of manufacturing the vane according to the present embodiment. The method of manufacturing the vane according to the present embodiment includes a material forming process (a) (FIG. 3A), a crude processing process (b) (FIG. 3B), an oil impregnating process (c) (FIG. 3C), and a finishing process (d) (FIG. 3D).

In the material forming process (a), a base material 31 is formed. Specifically, first, a fiber sheet woven in a mesh shape is immersed into a pool of liquid-state thermosetting resin. After the fiber sheet absorbs the liquid-state thermosetting resin, the fiber sheet is lifted up from the pool. The fiber sheet is heated by being interposed in a press device so as to cure the thermosetting resin, thereby forming the base material 31. An area in a top view (hereinafter, a plane area) of the base material 31 is set to a size capable of extracting a plurality of final products.

In the crude processing process (b), a width cutting and a thickness processing are performed on the base material 31, thereby forming a crude product 32. A plane area and a thickness of the crude product 32 are slightly larger than those of the final product.

In the oil impregnating process (c), the crude product 32 is immersed into oil 90.

Figure 4:
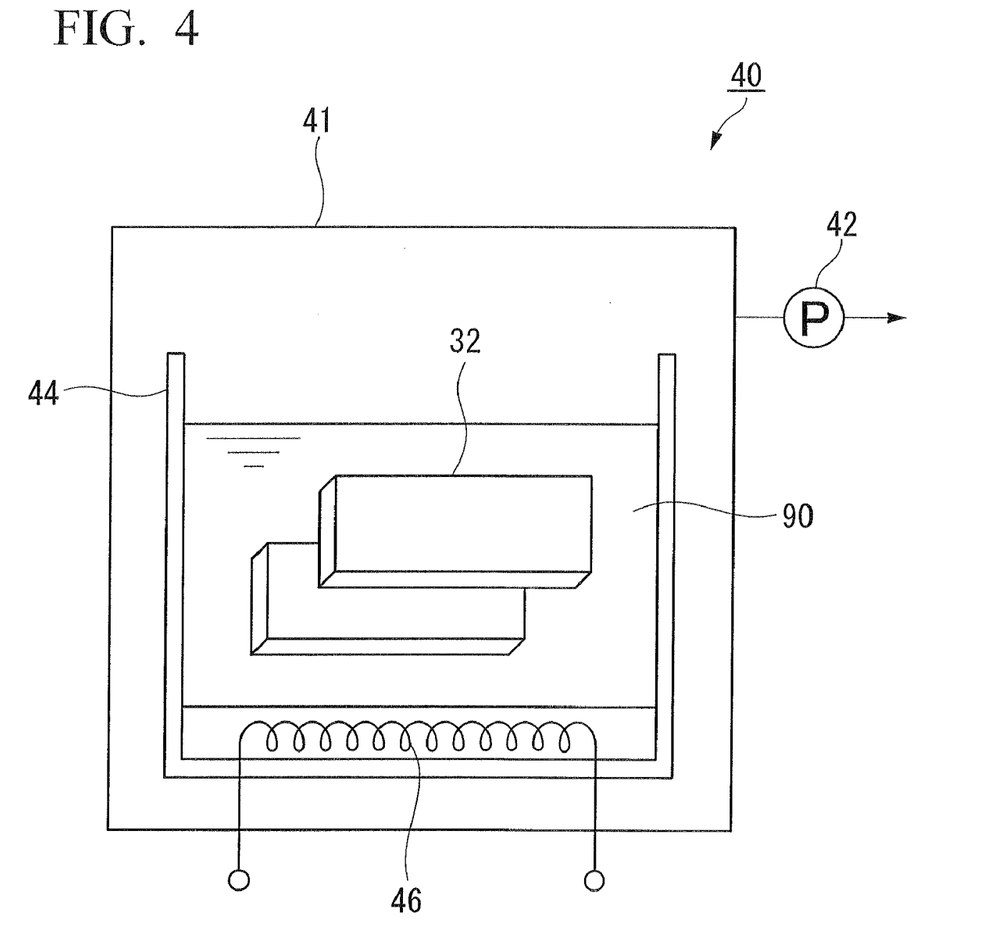
FIG. 4 is a schematic configuration diagram showing an oil impregnation device used for an oil impregnating process, according to the embodiment of the invention.

FIG. 4 is a schematic configuration diagram showing an oil impregnation device used in an oil impregnating process. An oil impregnation device 40 includes a chamber 41. The chamber 41 is connected to a vacuum pump 42 for depressurizing the inside of the chamber 41. An oil tank 44 is provided in the inside of the chamber 41. The oil 90 used for the oil-sealed rotary vacuum pump 10 is stored in the oil tank 44. A heater 46 which heats the oil 90 is provided at the bottom portion of the oil container 44.

In the oil impregnation device 40, the inside of the chamber 41 is depressurized by the vacuum pump 42. Specifically, the pressure of the chamber 41 is depressurized to be a predetermined pressure not larger than a minimum pressure (i.e., an ultimate pressure of the oil-sealed rotary vacuum pump 10) in the vicinity of the vane upon running the oil-sealed rotary vacuum pump 10. For example, it is desirable that the depressurizing be carried out up to 1,000 Pa or so.

The oil 90 is heated by the heater. Specifically, the heating is carried out so that a temperature of the crude product 32 immersed into the oil 90 is equal to a predetermined temperature not lower than the maximum temperature of the vane upon running the oil-sealed rotary vacuum pump 10. Additionally, it is desirable that the heating be carried out so that the temperature of the crude product 32 is not lower than a curing temperature of the thermosetting resin contained in the material of the vane. Furthermore, it is desirable that the heating be carried out so that the temperature of the crude product 32 is not lower than a temperature at which low vapor pressure components (i.e., moisture or hydrocarbon) contained in the material of the vane are removed. Furthermore, it is desirable that the heating is carried out so that the temperature of the crude product 32 is not higher than a temperature capable of maintaining mechanical strength of the material of the vane and not higher than a temperature of the degradation limit (i.e., glass transition or heat decomposition) of the material of the vane. For example, the heating may be carried out in the range of 150° C. to 160° C.

Then, the crude product 32 is immersed into the heated oil 90. Additionally, in the case of hydrocarbon-based oil, when the process is repeated, the low vapor pressure component increases due to oxidation degradation. Accordingly, it is necessary to replace the hydrocarbon-based oil at a periodic timing.

In the material forming process (a), since the pressurizing and the heating of the press device are not uniform, the progress and degree of the curing of the thermosetting resin may vary. Therefore, without the oil impregnating process (c), when the temperature of the vane becomes high upon running the oil-sealed rotary vacuum pump 10, the curing of the thermosetting resin partially further progresses, thereby causing a problem of shrinkage deformation of the vane.

On the contrary, in the method of manufacturing the vane according to the present embodiment, since the crude product 32 is heated under the depressurized condition in the oil impregnating process (c), it is possible to promote the curing of the thermosetting resin. Particularly, since the oil impregnating process (c) is carried out in a more strict condition (in terms of pressure and temperature, or the like) than the condition upon running the oil-sealed rotary vacuum pump 10, it is possible to prevent the progress of the curing upon running the oil-sealed rotary vacuum pump 10. Additionally, since the crude product is heated to a temperature not lower than the thermosetting temperature of the thermosetting resin contained in the material of the vane, it is possible to completely cure the thermosetting resin. Accordingly, it is possible to prevent deformation of the vane upon running the oil-sealed rotary vacuum pump 10.

Furthermore, in the method of manufacturing the vane according to the related art, the heat-treating process is carried out at the atmospheric pressure. For this reason, even when the heat-treating process is carried out at a temperature not lower than the maximum temperature of the vane upon running the oil-sealed rotary vacuum pump, it is difficult to completely remove the low vapor pressure component contained in the material of the vane. When the low vapor pressure component is removed from the vane upon running the oil-sealed rotary vacuum pump, a problem arises in that shrinkage deformation of the vane occurs.

In contrast, in the method of manufacturing the vane according to the present embodiment, since the crude product 32 is heated under the depressurized condition in the oil impregnating process (c), it is possible to promote the removal of the low vapor pressure component contained in the material of the vane. For example, even when the crude product is heated to a temperature lower than a temperature of the heat-treating process according to the related art, it is possible to realize the removal of the low vapor pressure component at the same level as that of the related art. In the present embodiment, since the oil impregnating process (c) is carried out in the more strict condition (pressure and temperature) than the condition upon running the oil-sealed rotary vacuum pump 10, it is possible to prevent the separation of the low vapor pressure component upon running the oil-sealed rotary vacuum pump 10. Additionally, since the crude product is heated to a temperature not lower than a temperature at which the low vapor pressure component contained in the material of the vane is removed, it is possible to completely remove the low vapor pressure component contained in the material of the vane. Accordingly, it is possible to prevent the deformation of the vane upon running the oil-sealed rotary vacuum pump 10.

Furthermore, in the method of manufacturing the vane according to the related art, even if the low vapor pressure component was removed by carrying out the heat-treating process at a high temperature, the vane may still expand and deform before performing the finishing process, since moisture contained in the atmosphere will get incorporated into spaces formed by the separation (moisture absorption). For this reason, a problem arises in that shrinkage deformation of the vane occurs since the moisture is removed from the vane upon running the oil-sealed rotary vacuum pump.

In contrast, in the method of manufacturing the vane according to the present embodiment, since the crude product 32 is immersed into the oil 90 while being heated under the depressurized condition in the oil impregnating process (c), it is possible to impregnate the oil into the space formed by the separation of the low vapor pressure component. Accordingly, it is possible to prevent moisture from entering the space formed by the separation and to prevent the deformation of the vane upon running the oil-sealed rotary vacuum pump 10.

Furthermore, the oil is impregnated not only into microscopic spaces formed by the removal of the low vapor pressure components, but also into gaps formed between the woven fibers, into spaces formed by volume variations caused by the progress of the thermosetting of the resin, and into spaces enclosing gas components unintentionally emerged in the process of the curing. Accordingly, it is possible to prevent the deformation of the vane upon running the oil-sealed rotary vacuum pump 10. Likewise, in all cases where any gaps are formed in the materials of the vane, the present invention is effective.

In the finishing process (d) (FIG. 3D), the crude product is processed with high precision to thereby form the final product 30. In the present embodiment, the thermosetting resin forming the vane is completely cured before the finishing process, the low vapor pressure component is removed from the inside of the resin, and then the oil is impregnated into the space formed by the removal before the finishing process. Therefore, it is possible to prevent the final product from expanding and shrinking after the finishing process. Accordingly, it is possible to prevent the deformation of the vane upon running the oil-sealed rotary vacuum pump 10.

Furthermore, in the oil impregnating process (c) according to the present embodiment, the vane is immersed into the heated oil. Alternatively, if the vane is formed of material not reactive to the heating (i.e., light curing resin), and also the low vapor pressure component is not contained in the material of the vane, the oil impregnating process (c) may be carried out by immersing the vane in unheated oil.

(Second Embodiment)

Next, a method of manufacturing the vane according to a second embodiment of the invention will be described. In the first embodiment, as explained above, the oil impregnating process was carried out using a high-temperature oil under the depressurized condition. Instead, in the second embodiment, a heating process of heating the vane under the depressurized condition, and an oil impregnating process of immersing the vane into the oil under the depressurized condition are carried out separately. For the components having the same configuration as that of the first embodiment, the detailed description thereof will be omitted.

In the second embodiment, the heating process of heating the crude product under the depressurized condition is carried out after the crude product is formed by the crude processing process. Since it is difficult to carry out the heating using heat radiation under the depressurized condition, the heating is carried out using heat transmission. Specifically, a hot plate is provided in the chamber, the crude product is placed on the hot plate, and then the crude product is heated by the heat transmission from the hot plate. The heating temperature of the vane and the pressure in the chamber are the same as those of the first embodiment.

Accordingly, it is possible to completely cure the thermosetting resin as the material of the vane and to remove the low vapor pressure component from the inside of the material of the vane.

Subsequently, while the crude product is maintained under the depressurized condition in the heating process, the oil impregnating process of immersing the crude product into the oil is carried out. Accordingly, it is possible to impregnate the oil into the space formed by the removal of the low vapor pressure component. Accordingly, it is possible to prevent moisture contained in the atmosphere from entering the space formed by the removal. Since the vane is heated in the heating process, the oil needs not to be heated in the oil impregnating process, but may be heated.

Subsequently, the final product is formed in the finishing process. In the second embodiment, the curing of the thermosetting resin forming the vane is advanced to completion, and the low vapor pressure component is removed from the inside of the resin, and then the oil is impregnated into the space formed by the removal before the finishing process. Accordingly, it is possible to prevent the deformation of the vane upon running the oil-sealed rotary vacuum pump.

Furthermore, the technical scope of the invention is not limited to the above-described embodiments, but various modifications may be made to the above-described embodiments without departing from the spirit of the invention. That is, the specific materials or configurations in the above-described embodiments are exemplary of the invention, but may be appropriately modified.

For example, although the oil-sealed rotary vacuum pump 10 provided with two vanes is described in the above-described embodiments, the present invention may be applied to the oil-sealed rotary vacuum pump provided with one, three or more vanes.

Additionally, although the oil-sealed rotary vacuum pump 10 is described in the above-described embodiments in which the vane is brought into contact with the inner surface of the cylinder by a centrifugal force, the invention may be applied to the oil-sealed rotary vacuum pump in which the vane is urged toward the inner surface of the cylinder by a coil spring or the like.

According to the invention, it is possible to remove the low vapor pressure component from the inside of the vane by disposing the vane under the depressurized condition. Furthermore, since the vane is immersed into the oil, it is possible to impregnate the oil into the inner space of the vane. For this reason, it is possible to prevent dilation deformation caused by the vane having absorbed moisture after the finishing process. Accordingly, it is possible to prevent the deformation of the vane caused by the moisture removed from the vane upon running the oil-sealed rotary vacuum pump.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method of manufacturing a vane used for an oil-sealed rotary vacuum pump and having at least a part formed of a resin material, the method comprising:
   a crude processing process of forming a crude product from a base material, the crude product being larger than a final shape of the vane;
   an oil impregnating process of immersing the crude product into oil used for the oil-sealed rotary vacuum pump under a depressurized condition; and
   a finishing process of finishing the crude product into the final shape,
   wherein the oil impregnating process being carried out before the finishing process;
   the resin material is a thermosetting resin; and
   in the oil impregnating process, the crude product is heated to a temperature greater than or equal to a curing temperature of the thermosetting resin via the oil.

2. The method according to claim 1, wherein a pressure of the depressurized condition is equal to or lower than a minimum pressure in the vicinity of the vane upon running the oil-sealed rotary vacuum pump.

3. A method of manufacturing a vane used for an oil-sealed rotary vacuum pump and having at least a part formed of resin material, the method comprising:
   a crude processing process of forming a crude product from a base material, the crude product being larger than a final shape of the vane;
   a heating process of heating the crude product at a predetermined temperature under a depressurized condition;
   an oil impregnating process of immersing the crude product into oil used for the oil-sealed rotary vacuum pump in a state where the crude product is maintained under the depressurized condition from the heating process; and
   a finishing process of finishing the crude product into the final shape, wherein the heating process is carried out before the finishing process; the resin material is a thermosetting resin; and
   the predetermined temperature is a temperature equal to or greater than or equal to a curing temperature of the thermosetting resin.

4. The method according to claim 3, wherein a pressure of the depressurized condition is equal to or lower than a minimum pressure in the vicinity of the vane upon running the oil-sealed rotary vacuum pump.

* * * * *